(12) United States Patent
Vanhooydonck et al.

(10) Patent No.: US 7,025,437 B2
(45) Date of Patent: Apr. 11, 2006

(54) PRINTING METHODS AND APPARATUS FOR MUTUALLY INTERSTITIAL PRINTING AND OPTIONAL INTERLACING

(75) Inventors: Rudi Vanhooydonck, Zwijndrecht (BE); Patrick Van den Bergen, Hove (BE)

(73) Assignee: Agfa-Gevaert, Mortsel (BE)

( * ) Notice: Subject to any disclaimer, the term of this patent is extended or adjusted under 35 U.S.C. 154(b) by 40 days.

(21) Appl. No.: 10/252,271

(22) Filed: Sep. 23, 2002

(65) Prior Publication Data

US 2003/0098898 A1   May 29, 2003

Related U.S. Application Data

(60) Provisional application No. 60/336,764, filed on Dec. 3, 2001.

(30) Foreign Application Priority Data

Oct. 31, 2001   (EP) ................... 01000586

(51) Int. Cl.
*B41J 2/15*   (2006.01)
*B41J 2/145*   (2006.01)
*B41J 29/38*   (2006.01)

(52) U.S. Cl. .............. 347/41; 347/9; 347/12
(58) Field of Classification Search .......... 347/41, 347/16, 40, 9, 43, 12
See application file for complete search history.

(56) References Cited

U.S. PATENT DOCUMENTS

| 4,622,560 | A  | * | 11/1986 | Withoos et al. ............ 347/12 |
| 5,640,183 | A  | * | 6/1997  | Hackleman ................. 347/40 |
| 5,734,393 | A  | * | 3/1998  | Eriksen ..................... 347/41 |
| 6,217,148 | B1 | * | 4/2001  | Adler et al. ............... 347/41 |
| 6,491,367 | B1 | * | 12/2002 | Miyasaka et al. .......... 347/23 |

FOREIGN PATENT DOCUMENTS

| EP | 0 961 222 A2 | 12/1999 |
| EP | 0 962 318 A1 | 12/1999 |
| EP | 1 084 846 A1 | 3/2001 |
| EP | 01 00 0586   | 4/2002 |

* cited by examiner

*Primary Examiner*—Thinh Nguyen
(74) *Attorney, Agent, or Firm*—John A. Merecki; Robert A. Sabourin (57) ABSTRACT

A dot matrix printing method is provided for printing an image on a printing medium with a printing head and having an array of equally spaced marking elements. The marking elements are spaced apart by a distance "x" in a slow scan direction and there is a first relative linear movement between the printing head and the printing medium in a fast scan direction perpendicular to the slow scan direction. The method includes printing the image as at least one set of monochromatic mutually interstitially printed sub-images wherein at least one of the number of sub-images and a sequence in which the printing of the sub-images is performed is settable by the user. An apparatus for dot matrix printing an image on a printing medium is also provided.

23 Claims, 4 Drawing Sheets

PRINTING METHODS AND APPARATUS FOR MUTUALLY INTERSTITIAL PRINTING AND OPTIONAL INTERLACING

This application claims the benefit of Provisional Aplication No. 60/336,764, filed Dec. 3, 2001.

The present invention relates to methods and apparatus for printing, such as ink jet or thermal transfer printing, especially non-contact printing.

TECHNICAL BACKGROUND

Printing is one of the most popular ways of conveying information to members of the general public. Digital printing using dot matrix printers allows rapid printing of text and graphics stored on computing devices such as personal computers. These printing methods allow rapid conversion of ideas and concepts to printed product at an economic price without time consuming and specialized production of intermediate printing plates such as lithographic plates. The development of digital printing methods has made printing an economic reality for the average person even in the home environment.

Conventional methods of dot matrix printing often involve the use of a printing head, e.g. an ink jet printing head, with a plurality of marking elements, e.g. ink jet nozzles. The marking elements transfer a marking material, e.g. ink or resin, from the printing head to a printing medium, e.g. paper or plastic. The printing may be monochrome, e.g. black, or multi-colored, e.g. full color printing using a CMY (cyan, magenta, yellow, black=a process black made up of a combination of C, M, Y), a CMYK (cyan, magenta, yellow, black), or a specialized color scheme, (e.g. CMYK plus one or more additional spot or specialized colors). To print a printing medium such as paper or plastic, the marking elements are used or "fired" in a specific order while the printing medium is moved relative to the printing head. Each time a marking element is fired, marking material, e.g. ink, is transferred to the printing medium by a method depending on the printing technology used. Typically, in one form of printer, the head will be moved relative to the printing medium to produce a so-called raster line which extends in a first direction, e.g. across a page. The first direction is sometimes called the "fast scan" direction. A raster line comprises a series of dots delivered onto the printing medium by the marking elements of the printing head. The printing medium is moved, usually intermittently, in a second direction perpendicular to the first direction. The second direction is often called the slow scan direction.

The combination of printing raster lines and moving the printing medium relative to the printing head results in a series of parallel raster lines which are usually closely spaced. Seen from a distance, the human eye perceives a complete image and does not resolve the image into individual dots provided these dots are close enough together. Closely spaced dots of different colors are not distinguishable individually but give the impression of colors determined by the amount or intensity of the three colors cyan, magenta and yellow which have been applied.

In order to improve the veracity of printing, e.g. of a straight line, it is preferred if the distance between dots of the dot matrix is small, that is the printing has a high resolution. Although it cannot be said that high resolution always means good printing, it is true that a minimum resolution is necessary for high quality printing. A small dot spacing in the slow scan direction means a small distance between marker elements on the head, whereas regularly spaced dots at a small distance in the fast scan direction places constraints on the quality of the drives used to move the printing head relative to the printing medium in the fast scan direction.

Generally, there is a mechanism for positioning a marker element in a proper location over the printing medium before it is fired. Usually, such a drive mechanism is controlled by a microprocessor, a programmable digital device such as a PAL, a PLA, a FPGA or similar although the skilled person will appreciate that anything controlled by software can also be controlled by dedicated hardware and that software is only one implementation strategy.

One general problem of dot matrix printing is the formation of artefacts caused by the digital nature of the image representation and the use of equally spaced dots. Certain artefacts such as Moiré patterns may be generated due to the fact that the printing attempts to portray a continuous image by a matrix or pattern of (almost) equally spaced dots. One source of artefacts can be errors in the placing of dots caused by a variety of manufacturing defects such as the location of the marker elements in the head or systematic errors in the movement of the printing head relative to the printing medium. In particular, if one marking element is misplaced or its firing direction deviates from the intended direction, the resulting printing will show a defect which can run throughout the printing. A variation in drop velocity will also cause artefacts when the printing head is moving as time of flight of the drop will vary with variation in the velocity. Similarly, a systematic error in the way the printing medium is moved relative to the printing medium may result in defects which may be visible. For example, slip between the drive for the printing medium and the printing medium itself will introduce errors. In fact, any geometrical limitation of the printing system can be a source of errors, e.g. the length of the printing head, the spacing between marking elements, the indexing distance of the printing medium relative to the head in the slow scan direction. Such errors may result in "banding" that is the distinct impression that the printing has been applied in a series of bands. The errors involved can be very small—the color discrimination, resolution and pattern recognition of the human eye are so well developed that it takes remarkably little for errors to become visible.

To alleviate some of these errors it is known to alternate or vary the use of marker elements so as to spread errors throughout the printing so that at least some systematic errors will then be disguised. For example, one method often called "shingling" is known from U.S. Pat. No. 4,967,203 which describes an ink jet printer and method. Each printing location or "pixel" can be printed by four dots, one each for cyan, magenta, yellow and black. Adjacent pixels on a raster line are not printed by the same nozzle in the printing head. Instead, every other pixel is printed using the same nozzle. In the known system the pixels are printed in a checkerboard pattern, that is, as the head traverses in the fast scan direction a nozzle is able to print at only every other pixel location. Thus, any nozzle which prints consistently in error does not result in a line of pixels in the slow scan direction each of which has the same error. However the result is that only 50% of the nozzles in the head can print at any one time. In fact, in practice, each nozzle prints at a location which deviates a certain amount from the correct position for this nozzle. The use of shingling can distribute these errors through the printing. It is generally accepted that shingling is an inefficient method of printing as not all the nozzles are used continuously and several passes are necessary.

As said above, this kind of printing has been called "shingling". However, printing dictionaries refer to "shingling" as a method to compensate for creep in book-making. The inventors are not aware of any industrially accepted term for the printing method wherein no adjacent pixels on a raster line are printed by one and the same nozzle. Therefore, from here on and in what follows, the terms "mutually interstitial printing" or "interstitial mutually interspersed printing" are used. It is meant by these terms that an image to be printed is split up in a set of sub-images, each sub-image comprising printed parts and spaces, and wherein at least a part of the spaces in one printed sub-image form a location for the printed parts of another sub-image, and vice versa.

Another method of printing is known as "interlacing", e.g. as described in U.S. Pat. No. 4,198,642. The purpose of this type of printing is to increase the resolution of the printing device. That is, although the spacing between nozzles on the printing head along the slow scan direction is a certain distance X, the distance between printed dots in the slow scan direction is less than this distance. The relative movement between the printing medium and the printing head is indexed by a distance given by the distance X divided by an integer.

There is a continuous requirement for improvements in printing methods and printers. In particular, there is a requirement to increase the efficiency of printing using the minimum number of passes while providing high quality.

It is an object of the present invention to provide a printing method and apparatus which provides high resolution printing at high speed with a reduced visible effect of systematic errors.

It is a further object of the present invention to provide a printer and a method of operating a printer which allows more user friendly operation with respect to the quality and complexity of the printing routines carried out.

SUMMARY OF THE INVENTION

In one aspect of the present invention a dot matrix printing method for printing an image on a printing medium, the method comprising, printing the image as at least one set of monochromatic mutually interstitially printed sub-images wherein at least one of the number of sub-images and the sequence in which the printing of the sub-images is performed is settable. The printing may be non-contact printing, e.g. inkjet.

The present invention may also provide dot matrix printing method for printing an image on a printing medium with a printing head having an array of equally spaced marking elements, the marking elements being spaced apart by a distance "x" in a slow scan direction and there being a first relative linear movement between the printing head and the printing medium in a fast scan direction perpendicular to the slow scan direction, the method comprising the steps of:

1) printing on the printing medium a matrix of dots using mutually interstitial printing steps and interlacing steps, the matrix of dots being in the form of two sets of substantially equally spaced parallel lines crossing at 90° to each other, each line of the first set extending in the slow scan direction and each line of the second set extending in the fast scan direction, each line comprising a series of dots formed by the marking elements, adjacent dots on one line extending in the fast scan direction not being formed by the same marking element; and 2) the distance "x" is substantially an integer multiple of the substantially equal distance between lines extending in the fast scan direction.

In a further aspect of the present invention an apparatus for dot matrix printing an image on a printing medium, comprising: an apparatus for dot matrix printing an image on a printing medium, comprising:

a printing head an array of equally spaced marking elements on the printing head, the marking elements being spaced apart by a distance "x" in a slow scan direction;

means for generating a first relative linear movement between the printing head and the printing medium in a fast scan direction perpendicular to the slow scan direction, the apparatus being adapted to print the image as at least one set of monochromatic mutually interstitially printed sub-images wherein at least one of the number of sub-images and the sequence in which the printing of the sub-images is performed is settable.

In accordance with the present invention the printing apparatus may be adapted to print on the printing medium a matrix of dots using both mutually interstitial printing steps and interlacing steps, the matrix of dots being in the form of two sets of substantially equally spaced parallel lines crossing at 90° to each other, each line of the first set extending in the slow scan direction, each line of the second set extending in the fast scan direction, each line comprising a series of dots formed by the marking elements, adjacent dots on one line extending in the fast scan direction not being formed by the same marking element and the distance "x" being substantially an integer multiple of the substantially equal distance between lines extending in the fast scan direction.

The present invention also includes a control unit for a dot matrix printer for printing an image on a printing medium, the control unit comprising, means for controlling printing of the image as at least one set of monochromatic mutually interstitially printed sub-images, and means for setting at least one of the number of sub-images and a sequence for printing of the sub-images.

In another aspect of the present invention a computer program product is provided for executing any of the methods of the invention when executed on a computing device associated with a printing head. The present invention also includes a machine readable data storage device storing the computer program product. The present invention also includes transmitting the computer program over a wide area or local area network.

The dependent claims each define an independent embodiment of the present invention.

The present invention will now be described with reference to the following drawings.

DESCRIPTION OF ILLUSTRATIVE EMBODIMENTS

The present invention will be described with reference to certain embodiments and drawings but the present invention is not limited thereto but only by the claims. The present invention will be described with reference mainly to ink-jet printing but the present invention is not limited thereto. The term "printing", as used in this invention should be construed broadly. It relates to forming markings whether by ink or other materials or methods onto a printing substrate. Various printing methods which may be used with the present invention are described in the book "Principles of non-impact printing", J. L. Johnson, Palatino Press, Irvine, 1998, e.g. thermal transfer printing, thermal dye transfer printing, deflected ink jet printing, ion projection printing, field control printing, impulse ink jet printing, drop-on-demand ink jet printing, continuous ink jet printing. Non-contact printing methods are particularly preferred. However, the present invention is not limited thereto. Any form of printing including dots or droplets on a substrate is included within the scope of the present invention, e.g. piezoelectric printing heads may be used to print polymer materials as used and described by Plastic Logic (http://plasticlogic.com/) for the printing of thin film transistors. Hence, the term "printing" in accordance with the present invention not only includes marking with conventional staining inks but also the formation of printed structures or areas of different characteristics on a substrate. On example is the printing of water repellent or water attractive regions on a substrate in order to form an off-set printing plate by printing. Accordingly, the term "printing medium" or "printing substrate" should also be given a wide meaning including not only paper, transparent sheets, textiles but also flat plates or curved plates which may be included in or be part of a printing press. In addition the printing may be carried out at room temperature or at elevated temperature, e.g. to print a hot-melt adhesive the printing head may be heated above the melting temperature. Accordingly, the term "link" should also be interpreted broadly including not only conventional inks but also solid materials such as polymers which may be printed in solution or by lowering their viscosity at high temperatures as well as materials which provide some characteristic to a printed substrate such as information defined by a structure on the surface of the printing substrate, water repellence, or binding molecules such as DNA which are spotted onto microarrays. As solvents both water and organic solvents may be used. Inks as used with the present invention may include a variety of additives such as ant-oxidants, pigments and cross-linking agents.

Figure 1:
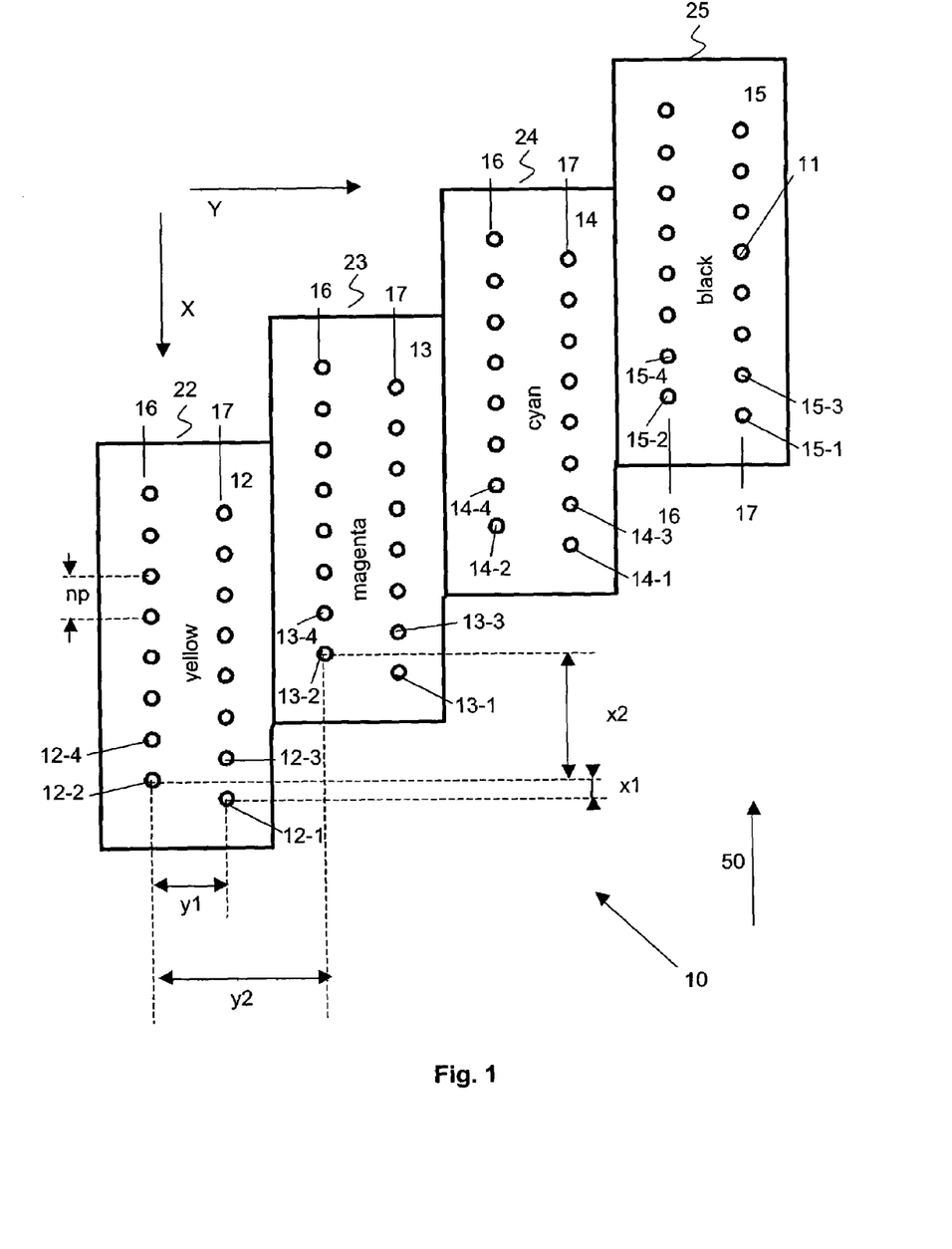
FIG. 1 shows schematically a printing head that may be used according to the present invention.

A dot matrix printing head of a kind which may be used with the present invention is shown schematically in FIG. 1.

As shown in FIG. 1 a scanning printing head 10 may have an elongate form having a longitudinal axis 50. The printing head 10 comprises a plurality of marker elements 11, for example a plurality of ink jetting orifices 12-1 . . . 12-n, 13-1 . . . 13-n, 14-1 . . . 14-n, 15-1 . . . 15-n for the colors yellow, magenta, cyan and black each arranged in an array 12, 13, 14, 15 respectively which may comprise one or more rows. As shown in FIG. 1 there are two rows 16, 17 per color whereby the second row 17 is offset by half a nozzle pitch np with respect to the first row 16.

Generally, the head 10 is moved relative to a printing medium (such as paper) in the direction indicated with the arrow "Y" known as the fast scan direction which, in the example given, is perpendicular to the longitudinal axis 50 of the head 10. In an alternative embodiment, not shown in the drawings, the head may be placed in a slanted position with regard to the fast scan direction, to increase the printing resolution. The printing head 10 may comprise an ink cartridge carried on a movable carriage assembly. By repeatedly firing the arrays 12, 13, 14, 15 of nozzles 11 and moving in the fast scan direction ink drops are deposited on the printing medium in parallel lines across the printing medium in accordance with an image to be printed. Each line of printing from a single nozzle 11 is known as a raster line. When the head 10 has traversed the printing medium it returns to its starting position and the process begins again. The printing head 10 may print on the way back—i.e. printing a second pass, or the printing head 10 may only print when moving in one direction. The printing medium may be indexed in the slow scan direction X (perpendicular to the fast scan direction Y and, in the example given, parallel to the longitudinal axis 50 of the printing head 10) between passes. The firing of the nozzles 11 is controlled by a control device, e.g. a microprocessor or microcontroller (see FIG. 7), the firing being in accordance with a digital representation of an image which is processed by the control device. The digital representation of an image may be provided by a graphics software program running on a host computer or by scanning in an image. In this way a complete image is printed.

Within an array of nozzles 12, 13, 14, 15 adjacent nozzles in the slow scan direction, e.g. 12-2, 12-4 have a spacing "np" (nozzle pitch). This is usually constant for an array.

Figure 2:
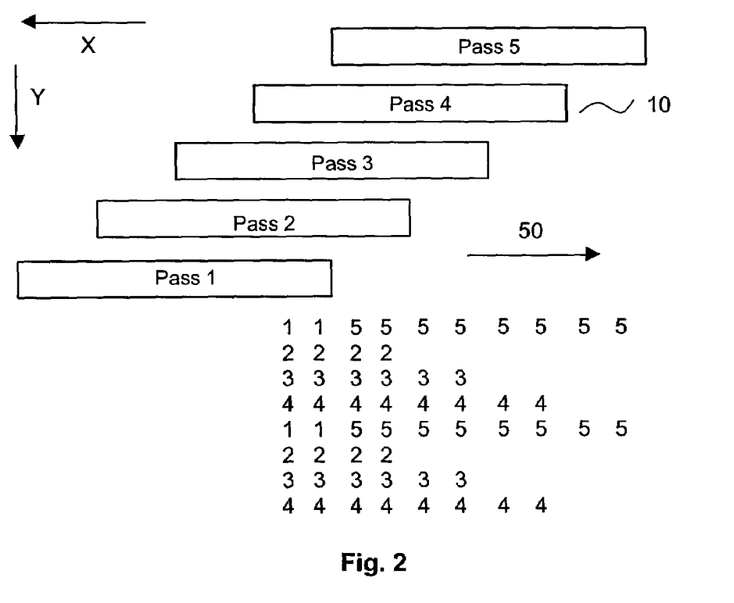
FIG. 2 illustrates mutually interstitial or mutually interspersed printing.

First the concept of mutually interstitial printing or mutually interspersed printing will be explained as applied to a traversing or scanning head 10 for printing one color only (e.g. a black head). FIG. 2 shows how an image is divided in sub-images, which are mutually interstitially printed using a Mutual Interstitial Printing Ratio (MIPR) of 25% but which are not interlaced. When looking at FIG. 2 it would appear that the head 10 is displaced in a slow scan direction −X with respect to the printing medium. This in fact refers to relative motion between the two and the typical implementation is that the printing medium is transported a distance relative to the head 10, e.g. a quarter of a head length, in the opposite direction to that shown in FIG. 2 (i.e. in the +X direction). In the following, it is preferred to refer to the transport of the head 10 because the pixel position on the printing medium is the reference.

In a first pass, nozzles in a first fraction, e.g. a first quarter of the head 10 print every so many pixels, e.g. every fourth pixel in a column in the fast scan direction Y, beginning with the first row which is able to print. This is indicated by a 1 in the table of FIG. 2. This means that the head 10 is transported relative to the printing medium by an exact fraction of the head length, e.g. an exact number of nozzle pitches between the firing positions of the relevant nozzles. Note that whether or not the nozzles actually print depends on the image to be printed, i.e. whether or not a dot is to be printed at a certain location. Thus, a 1 in the table indicates the ability of the relevant nozzle to print at a location—it does not mean that it always prints at this location. Also, going down a "column" of the tables in the attached figures refers to going along the fast scan direction Y, i.e. the direction perpendicular to the longitudinal axis 50 of the printing head 10 in the example given.

After the first scan across the printing medium is complete, the head 10 is returned to the starting position and is transported a quarter of its length with respect to the printing medium in the slow scan direction (X) ready for pass 2. With "length of the head" is meant the length of the number of active nozzles available for the printing process. This is not necessarily the same as the length of the total number of nozzles on the head as the present invention includes using a sub-set of these nozzles for the printing operation. In this embodiment it is assumed that the head 10 does not print on the return trip but printing in both fast scan directions Y and −Y is included within the scope of the present invention. In the second pass the first half of the head 10 is printing every fourth pixel, beginning with the second row in the table (indicated by a 2 in the table). After the second pass is complete the print head 10 is displaced a quarter of its length again. In the third pass the first ¾ of the head 10 is printing every fourth pixel, beginning with the third row (indicated by 3). The print head 10 is transported a quarter of its length again in the slow scan direction. From now on the printer is printing with all nozzles every fourth pixel. The print head 10 is transported a quarter of its length again and the fifth pass (number 5) is printed every fourth row beginning with row 1 again in a new cycle. Such cycles are repeated continuously.

The result of this is that a dot in a column (i.e. in the fast scan direction Y) is only printed with the same nozzle every four pixels. Each adjacent dot in the Y direction is printed by a different nozzle. This means that if one nozzle 12-1, 13-1, 14-1, 15-1 produces a defective dot, this defect is camouflaged to some extent by being mixed in with dots produced by nozzles 12-2, 12-3, 12-4; 13-2, 13-3, 13-4; 14-2, 14-3, 14-4; 15-2, 15-3, 15-4, respectively.

The cycle repeats every four passes—this is 25% mutually interstitial printing. Because in each column each four successive dots are each printed with a different nozzle, banding problems due to nozzle-misalignment are hidden. The first passes don't have to have the same length. They can have any length provided the following condition is fulfilled: the distance represented by the sum of the head/printing medium relative movements in the first P passes, where P is an integer (4 in the above example), has to be equal to the exact active nozzle length, i.e. the length of the nozzle array of active nozzles (nozzles which are used to print or not print at a location), measured in nozzles. So it is for example also possible to print 1, transport the head a distance of a nozzle pitches, print 2; transport the head a distance of b nozzle pitches, print 3; transport the head a distance of c nozzle pitches, print 4; transport the head a distance of e=n−(a+b+c) nozzle pitches, where e has to be larger than 0 and n equals the number of active nozzles in the array. From this point on in the method this pattern has to be repeated until the complete image is printed.

Figure 3:
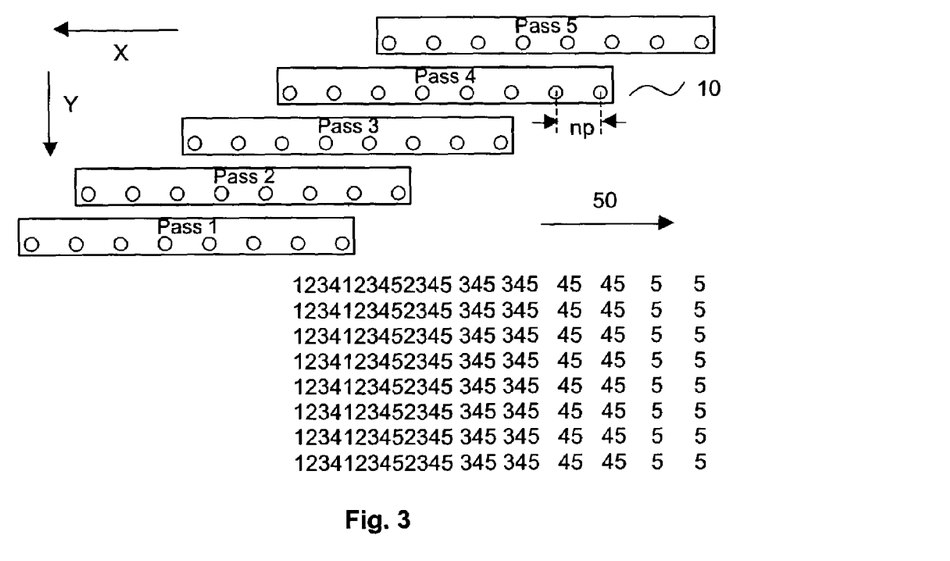
FIG. 3 illustrates interlacing.

Interlacing is a technique to obtain a higher resolution printed image than would be expected based on the nozzle distance np. For example, interlacing allows writing a 720 dpi (dots per inch) image with a 180 dpi head (i.e. the nozzles are spaced on the head so as to generate 180 dpi). With interlacing using a scanning head 10 the slow scan pixel pitch, that is the pitch of dots printed on the printing medium in the slow scan direction is smaller than the nozzle pitch np of the head 10 in the slow scan direction. The slow scan direction for a scanning head 10 is perpendicular to the fast scan direction, and, in the example given, is parallel to the longitudinal axis 50 of the head.

To continue with the example above and referring to FIG. 3, to achieve a higher resolution a first part of the head 10 (e.g. the first quarter) prints first every so many columns, e.g. every fourth column. Then the head 10 is transported by one pixel pitch+($k_1$*nozzle pitch), (note: $k_1$ is an integer which may be zero). Then in the next pass the head 10 prints again every so many columns, e.g. every fourth column beginning with the second one, then the print head is transported one pixel pitch+($k_2$*nozzle pitch), ($k_2$ is an integer which may be zero). This procedure is repeated a number of times, e.g. a third time and a fourth time, after which the print head can be displaced the rest of the head length. The value of k (generally, ki) can be chosen freely, e.g. in such a way that it is equal for every transport step $k_1=k_2=k_3=k_4$.

In accordance with embodiments of the present invention both mutually interstitial printing and interlacing are carried out to improve printing quality and to avoid banding. For example, in accordance with a first embodiment an image is divided in sub-images which are mutually interstitially printed 25% (generally: 100/P % with P the number of passes for the mutually interstitial printing) and interlaced to order 4. The image-resolution is 720 dpi, therefore it has to be written in 4 swaths using a head with a nozzle pitch of 140 μm (180 dpi). So, to write the complete image the head has to make 4 (P) (due to the mutually interstitial printing)×4 (I) (due to interlacing)=16 passes. This printing method will be described with reference to FIG. 4, for example for a 720 dpi image formed when sub-images are mutually interstitially printed 25% and interlaced to order 4.

Figure 4:
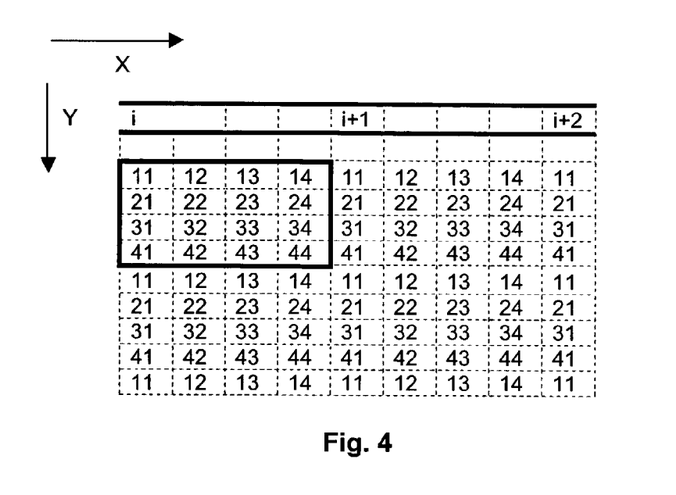
FIG. 4 illustrates printing of an image comprising a plurality of sub-images according to an embodiment of the present invention, the printing comprising interlacing steps and mutually interstitial printing steps.

It will be assumed for this embodiment of the present invention that mutually interstitial printing is done at 25% and the interlacing is of order 4, that is the pixel pitch in the slow scan direction is one quarter of the nozzle pitch np in the same direction on the head 10. The result is an image made up of 16 sub-images, each sub-image having a resolution of 180 dpi in the slow/fast scan direction. The present invention is not limited to the same number of mutually interstitial printing passes as interlacing passes, each number can be chosen freely provided the interlacing order is at least 2 and the mutually interstitial printing as 50% or less. In addition only one color will be considered when describing the present case although the invention may be applied to the colored printing case as will be described below.

Referring to FIG. 4 the head 10 writes first an image made up of the pixel positions having the "11" symbol. In the reference digit 11 the first digit "1" is the number of the pass used in mutually interstitial printing, the second digit "1" is the number of the pass in interlacing. An example of the printing procedure is given below:

The head 10 writes during the first pass with nozzle 1 in column 1 at pixels defined by symbol "11" in rows 1, 5, 9 etc. along the fast scan direction. The head 10 prints with nozzle 2 in the same pass pixel positions defined by the symbol "11" in column 5, row 1, 5, 9 etc. and prints with nozzle 3 the pixels defined by the symbol "11" in column 9, row 1, 5, 9 etc. The same is happening for the other nozzles. After printing the complete sub-image for "11", the head writes, during a second pass, the sub-image defined by the symbol "12", in the same way. Hence, after the first ("11") sub-image the head moves a pixel pitch plus k times a nozzle distance and the first interlacing level is performed for all mutually interstitial printing operations to complete another sub-image (e.g. "12"). Any other of the symbols can also be printed in this fashion. These 16 sub-images can be written completely independent from each other. Therefore, in general, the interlacing steps will be intercalated with mutually interstitial printing so that all the sub-images are being created concurrently rather than one after another. In fact the order in which the sub-images are printed, i.e. the way the printing traverses through the sub-image matrix 11, 12, 13, 14

21, 22, 23, 24

31, 32, 33, 34

41, 42, 43, 44 (1)

is freely selectable. The only requirement is that each one of the positions in selected once.

Figure 5:
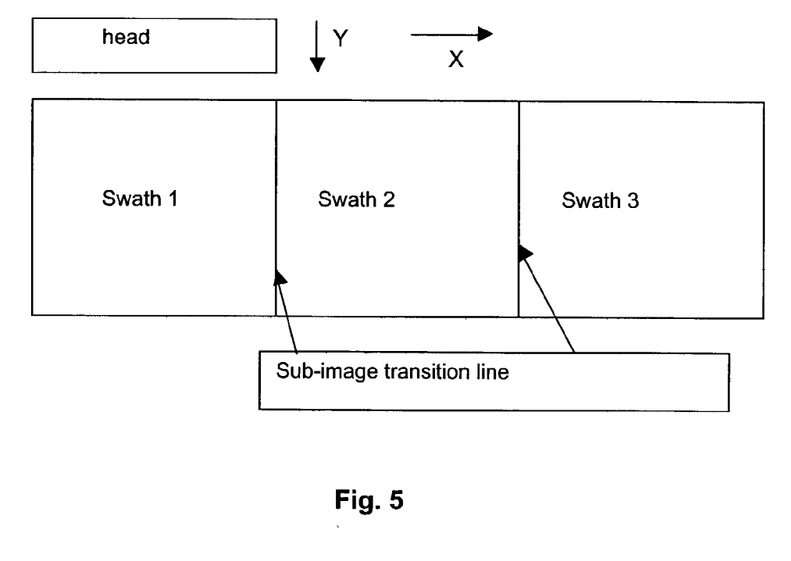
FIG. 5 shows a printed image consisting of different swaths.

A swath is defined by a part of a sub-image printed within a head length in one pass as shown in FIG. 5, the head length being the length of active nozzles able to fire in one pass. Thus, as the printing of one pass of one sub-image (e.g. the "11" sub-image) is completed whose distance in the slow scan direction X is one head length (the length of he active nozzles for printing), one swath has been printed. Then the second swath for the "11" sub-image is printed. In reality the second swath for one symbol, e.g. for "11", will typically be printed after that all the first swaths of the other sub-images are printed as the printing head makes many passes as it slowly progresses in the slow scan direction. This means that the printing goes through the sixteen positions of the above matrix before returning to a second swath for the "11" symbol. That is, swath 2 of symbol "11" is actually the $17^{th}$ pass in an image with 16 sub-images. All the other first swaths of each sub-image are printed first before the second swath of the first symbol is printed.

Generally, the number of sub-images in one image (N) is the product of the number of mutually interstitial printing passes P and the number of interlacing passes I $$N=P*I \quad (2)$$

Because a color image is composed of a number of different color separations, e.g. typically 3 or 4 different monochrome images, each color separation will be printed using the same independent combination of 16 swaths. So, a full color image which is mutually interstitially printed 25% and has a resolution 720 dpi can be written with a head of 180 dpi in 4×16 sub-images=64 independent sub-images. Generally, the number of sub-images (or swaths) is given by:

$$N=P*I*C \quad (3)$$

where C=Number of colors.

This can be presented as a cube with on each level one of the square matrices as explained above and on each column of the cube a color.

It is preferred in accordance with an embodiment of the present invention if the swath boundaries or swath transition lines for the sub-images "11" etc. do not fall together on the same line. Ideally, no two swath boundaries fall together onto one line. By distributing the swath boundaries through the printing, any systematic error caused by the length of the printing head can be hidden. It is the selection of the sequence of traversing the sub-image matrix (see (1) above) which determines where the swath boundaries will lie.

In accordance with further embodiments of the present invention banding due to paper transport can be suppressed. To achieve this the step distance for the relative motion between printing medium and the print head in the printing direction needs to be controlled.

To avoid banding due to transport of the printing medium, it is necessary to write images in such a way, that the swath transition lines for every sub-image is on a different place. This can be achieved if the printing is carried out in accordance with the next equations. This procedure will achieve that the swath transition lines are homogeneously spread over the image.

Firstly, the number of transport steps (=T) to reach one head length is given by:

$$T=N/h=(C \times P \times I)/h \quad (4)$$

where h is the number of nozzle rows written at the same time. This equation defines the number of transport steps T in one head length to be the number of sub-images divided by the number of rows which are printed at the same time. If the swath transition lines are to be spread equally over this distance then the transport distance step TD is defined approximately by:

$$TD=n/T \quad (5)$$

n being the number of nozzles in one nozzle row. These transport steps are preferably performed in at least 2 different step lengths in order to reach every position of the image.

For example: for I=4; and all I are written with the same head, the distances moved are:

n/T×1 dp/np
n/T×1 dp/np
n/T×1 dp/np
n/T+3 dp/np where dp is the pixel pitch and np is the nozzle pitch. This sequence of movements is repeated [(C×P)/h] times in order to complete one head length of the image.

Mutually interstitial printing of sub-images is used in the above examples to avoid banding due to nozzle misalignment. It is generally held that it is not possible to mutually interstitially print without slowing down the throughput of the system or without making a significant number of the nozzles in a head idle some of the time. In accordance with an embodiment of the present invention mutually interstitial printing of sub-images can be made more efficient by increasing the speed of traverse in the fast scan direction. Because each sub-image is a 180 dpi image, and because each of these images is independent of each other, each sub-image can be written with a minimum time between two neighboring pixels. This is called fast mutually interstitial printing. This means the first row and the second row of a sub-image (the second row in a 25% mutually interstitially printed image is the $5^{th}$ row of the image as there are pixels from three other sub-images in between), can be printed after the shortest time possible between two dots for example, 100 μs if a 10 kHz head is used, while in conventional mutually interstitial printing, there are 100 μs between each two lines of the image to be printed, thus for 25% mutually interstitial printing with a 10 kHz head there is 400 μs between the first and the second row of a sub-image. None of the intermediate pixels have to be printed in the same time when using fast mutually interstitial printing. Accordingly, all the active nozzles of the printing head relevant to one color can be available for printing at each relevant position, e.g. "11" or similar. This means that the head is used to optimum efficiency by combining interlacing and mutually interstitial printing. However, the present invention also includes a single printing operation of a line of dots with less than the full compliment of active nozzles, i.e. to select a specific redundancy of the nozzles, for example only every other active nozzle is available for firing at each print operation. This is the same as conventional mutually interstitial printing of sub-images in which there is a redundancy in the number of nozzles. If every other nozzle is used in one pass, this would mean a redundancy of 50%. To print with the other nozzles a further pass is required. The effect of the redundancy is that a sub-image is divided further into more sub-images, however, this printing is still mutual interstitial printing of all these sub-images in accordance with the present invention.

Furthermore, it is possible according to the present invention to use mixed mutually interstitial printing, which is a combination of fast and normal mutually interstitial printing. This means that part of an image is printed by fast mutually interstitial printing, and the other part of the image is printed by normal mutually interstitial printing. In this way, redundancy is obtained: one pixel can be reached more than once.

Preferably, the fast mutually interstitial printed part of the image comprises the highest possible number of sub-images, preferably all sub-images. However, any combination of fast and slow mutually interstitial printing is possible, e.g. one sub-image being fast mutually interstitial printed, and all the other sub-images being conventionally mutually interstitially printed.

The printing head 10 shown in FIG. 1 illustrates a printing head 10 consisting of four heads 22, 23, 24, 25, for yellow, cyan, magenta, and black respectively. Each head has a plurality of ink jetting orifices 12-1 . . . 12-n, 13-1 . . . 13-n, 14-1 . . . 14-n, 15-1 . . . 15-n for each color.

To avoid banding caused by non-homogeneously spreading of the swath transition line, the distance in the slow scan direction X between the first nozzle 12-2, 13-2, 14-2, 15-2 of a first nozzle row 16 of a head 22, 23, 24, 25, and the first nozzle 12-1, 13-1, 14-1, 15-1 of a second nozzle row 17 of that head 22, 23, 24, 25, further called x1, and the distance in the slow scan direction X between the first nozzle 12-2, 13-2, 14-2 of a first nozzle row 16 of a first head 22, 23, 24 and the first nozzle 13-2, 14-2, 15-2 of a first nozzle row 16 of a second head 23, 24, 25, further called x2, should be chosen such that all heads are equally spread over the distance TD. This can be done by choosing x1 and x2 equal to approximately TD/h. In this way all swath transition lines will be spread equally over the image. The configuration of the heads can be optimized in this way.

The most interesting distance of the heads with respect to each other will be as follows:

$$x2 = [\text{integer } (TD/h) + i*0.25 + k*TD]np$$

with k an integer, and i=0, 1, 2, 3. To have a faster throughput, k should be as low as possible, preferably k=0.

It is also possible to spread the heads unequally over the distance TD. This, however, has the disadvantage that the sub-image separation lines are not spread as homogeneously as possible over the image.

For heads with two nozzle rows 16, 17, as represented in FIG. 1, the same formula is also valid for x1, but now i=2 and k=0:

$$x1 = [\text{integer}(TD/h) + 0.5]np$$

The distance in the fast scan direction Y between the first nozzle 12-2, 13-2, 14-2, 15-2 of a first nozzle row 16 of a head 22, 23, 24, 25 and the first nozzle 12-1, 13-1, 14-1, 15-1 of a second nozzle row 17 of that head 22, 23, 24, 25, further called y1, and the distance in the fast scan direction Y between the first nozzle 12-2, 13-2, 14-2 of a first nozzle row 16 of a first head 22, 23, 24 and the first nozzle 13-2, 14-2, 15-2 of a first nozzle row 16 of a second head 23, 24, 25, further called y2, are not important because the place where a dot is printed depends on the time when it is printed. Any pixel position is reachable, just by changing the moment of firing.

For example, with a 180 dpi head a full color image of 720 dpi is to be printed. Therefore the image is to be divided in sub-images which are mutually interstitially printed 25% and interlaced 4 times. Four heads 22, 23, 24, 25 are used, each having two nozzle rows 16, 17 each comprising n nozzles. Each head 22, 23, 24, 25 has a different color, e.g. yellow, magenta, cyan, black. From the above, it is easy to calculate that his image consists of 64 sub-images (C*P*I). Each of these sub-images can be written by a head that writes the first n columns. The paper is transported, and the following n columns are written, etc., as explained with regard to FIG. 2. As there are, in the present example, 4 heads 22, 23, 24, 25 each having two nozzle rows 16, 17, eight swaths are printed in the same time before a next paper transport.

In order to avoid that the sub-image separation lines are on the same place, the heads 22, 23, 24, 25 should be organized so that the distance between nozzles of different nozzle rows is as indicated hereinabove. For the present system this means:

h (number of nozzle rows)=8 (4 heads with each 2 nozzle rows)
n (number of nozzles in a row)=382
C (number of colors)=4
P (number of mutually interstitial printing passes)=4
I (number of interlacing passes)=4
Therefore N (number of sub-images)=C*P*I=64
If the following formulae are used:
T=N/h→T=64/8=8
TD=n/T and a rest→TD=382/8=47 rest 6
x2=[integer (TD/h)+i*0.25+k*TD] np, with k an integer and i=(0, 1, 2, 3), and i=2 and k=8 is chosen (the following head is chosen to be placed without overlap with the first head)
x1=[integer (TD/h)+0.5] np, then:
x2=[integer (47/8)+2*0.25+8*47] np=381.5 np=381.5* 141.11 μm=53834 μm
x1=[integer (47/8)+0.5] np=5.5*141.11 μm=776 μm So the first nozzle 12-2, 12-1, 13-2, 13-1, 14-2, 14-1, 15-2, 15-1 of each nozzle row 16, 17 is as shown in the following table in reference to the first nozzle of the first head:

|  | Nozzle row 16 | Nozzle row 16 |
|---|---|---|
| Head 22 | 0 μm | 776 μm |
| Head 23 | 54610 μm | 55386 μm |
| Head 24 | 109220 μm | 109996 μm |
| Head 25 | 163830 μm | 164606 μm |

When the heads are arranged as in the table, and TD=alternating 46.75 and 47.25 np (so that the average is 47 np), and this process is repeated 8 times (once for each swath), all sub-image separation lines are equally spread over the image.

The image process steps look as follows: when the first nozzle array of the first head is writing the "11"-sub-image, the second nozzle array of the same head can write one of the following images: "13", "23", "33", "43". Which of those images can be printed, depends on the timing when the dots are printed. The other 15 locations are also possible, but then another configuration of the heads is necessary.

It is important that no neighbors are printed during a same pass, in order to avoid banding and coalescence. Therefore, if the first nozzle row is writing "11", it is best to choose for the second nozzle row a pixel position in the cross area indicated in the following table:

To write a complete image, all 16 sub-images of a same color have to be printed. Therefore the first nozzle row of a head is writing 8 sub-images, and the second nozzle row of that head is writing the other 8 sub-images. A possible combination can be found in the following list:

When nozzle row 1 is writing 11 nozzle row 2 is writing 13
When nozzle row 1 is writing 12 nozzle row 2 is writing 14
When nozzle row 1 is writing 21 nozzle row 2 is writing 23
When nozzle row 1 is writing 22 nozzle row 2 is writing 24
When nozzle row 1 is writing 31 nozzle row 2 is writing 33
When nozzle row 1 is writing 32 nozzle row 2 is writing 34
When nozzle row 1 is writing 41 nozzle row 2 is writing 43
When nozzle row 1 is writing 42 nozzle row 2 is writing 44

In this way bleeding is not possible, because the dots which are printed during a same pass have a distance of 71 μm and a dot is not that big.

It is to be noted that TD=integer (382/8)+rest=47+6. Because after T transport steps the head is displaced T*TD=8*47=376 np, the last 6 nozzles of the head cannot be used. Indeed, after those T*TD transport steps, the head has to print the next swath for each sub-image.

Because colors have to be printed in a certain order (e.g. first yellow, then magenta, then cyan, then black), a number of passes should occur in order to fulfil the following conditions:

a dot of a second color can only be printed upon a pixel position after the first color has been printed there,
to avoid bleeding, no two pixels which are each others neighbors can be printed at the same time,
a dot of a second color can only be printed if all its neighbors are printed in the first color to avoid color differences caused by different color overlap.

To obtain this, nozzle rows printing different colors are staggered.

If two nozzle rows are used to write two different colors, the distance x2 between the first nozzle of the first nozzle row and the first nozzle of the second nozzle row has to be at least $(2*I/hs)/(T)$ of a nozzle row length in the slow scan direction, with I the number of interlacing passes, hs the number of nozzle rows printing the same color, and T the number of transport steps to reach one head length. When overlapping dots still deteriorate the image result, the distance x2 has to be at least $(3*I/hs)/(T)$ times the nozzle row length in the slow scan direction. In this case a drop of the second color is always on top of a drop of the first color.

The higher the number of mutually interstitial printing passes P is chosen, the nearer the nozzle rows can be put to each other in the slow scan direction. This is because $(3*I/hs)/T=(3*I/hs)/(N/h)=(3*I*(h/hs))/N=(3*I*C)/(P*I*C)=3/P$ fulfil the conditions for color order, the maximum overlap for heads printing two different colors is $1-3/P$. In the same way, it can be calculated that in order to fulfil the conditions for color order, the maximum overlap for heads printing two different colors will be $1-3/I$. As mutually interstitial printing is more flexible than interlacing, the preferred overlap of the heads is $1-3/P$.

In the next table, the results are described for different numbers of mutually interstitial printing passes:

| Mutually interstitial printing | Passes P | Nozzle row overlap (not all neighbors are printed) $1-2/P$ | Nozzle row overlap (all neighbors are printed) $1-3/P$ |
|---|---|---|---|
| 50% | 2 | 0 | 0 |
| 25% | 4 | 2/4 = 1/2 | 1/4 |
| 12.5% | 8 | 6/8 = 3/4 | 5/8 |

Figures 6, 7:
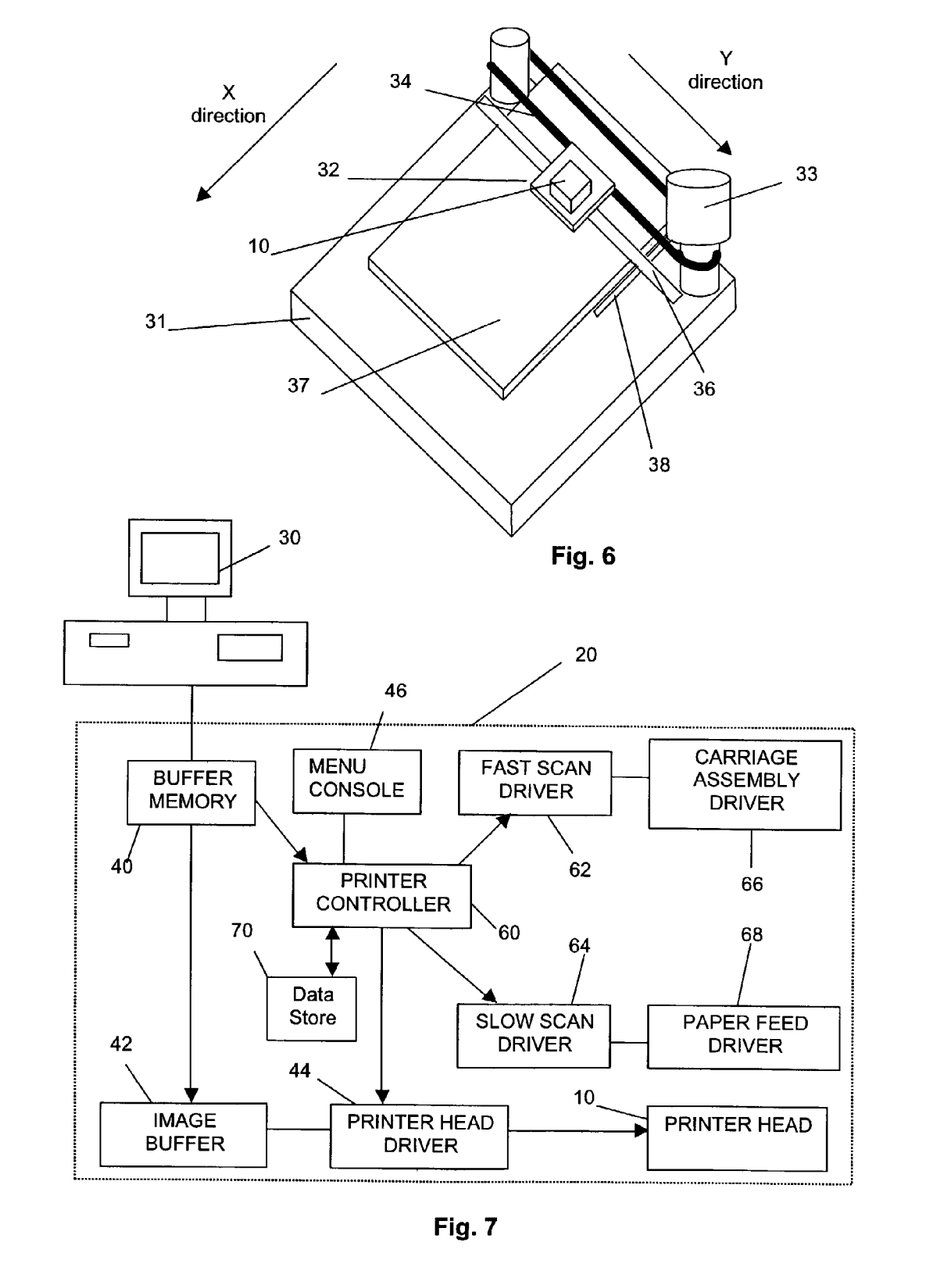
FIG. 6 is a highly schematic representation of an inkjet printer for use with the present invention.
FIG. 7 is a schematic representation of a printer controller in accordance with an embodiment of the present invention.

FIG. 6 is a highly schematic general perspective view of an inkjet printer 20 which can be used with the present invention. The printer 20 includes a base 31, a carriage assembly 32, a step motor 33, a drive belt 34 driven by the step motor 33, and a guide rail assembly 36 for the carriage assembly 32. Mounted on the carriage assembly 32 is a print head 10 that has a plurality of nozzles. The print head 10 may also include one or more ink cartridges or any suitable ink supply system. A sheet of paper 37 is fed in the slow scan direction over a support 38 by a feed mechanism (not shown). The carriage assembly 32 is moved along the guide rail assembly 36 by the action of the drive belt 34 driven by the step motor 33 in the fast scanning direction.

FIG. 7 is a block diagram of the electronic control system of a printer 20, which is one example of a control system for use with a print head 10 in accordance with the present invention. The printer 20 includes a buffer memory 40 for receiving a print file in the form of signals from a host computer 30, an image buffer 42 for storing printing data, and a printer controller 60 that controls the overall operation of the printer 10. Connected to the printer controller 60 are a fast scan driver 62 for a carriage assembly drive motor 66, a slow scan driver 64 for a paper feed drive motor 68, and a head driver 44 for the print head 10. In addition there is a data store 70 for storing parameters for controlling the interlaced and mutual interstitial printing operation in accordance with the present invention. Host computer 30 may be any suitable programmable computing device such as personal computer with a Pentium III microprocessor supplied by Intel Corp. USA, for instance, with memory and a graphical interface such as Windows 98 as supplied by Microsoft Corp. USA. The printer controller 60 may include a computing device, e.g. microprocessor, for instance it may be a microcontroller. In particular, it may include a programmable printer controller, for instance a programmable digital logic element such as a Programmable Array Logic (PAL), a Programmable Logic Array, a Programmable Gate Array, especially a Field Programmable Gate Array (FPGA).

The use of an FPGA allows subsequent programming of the printer device, e.g. by downloading the required settings of the FPGA.

The user of printer 20 can optionally set values into the data store 70 so as to modify the operation of the printer head 10. The user can for instance set values into the data store 70 by means of a menu console 46 on the printer 20. Alternatively, these parameters may be set into the data store 70 from host computer 30, e.g. by manual entry via a keyboard. For example, based on data specified and entered by the user, a printer driver (not shown) of the host computer 30 determines the various parameters that define the printing operations and transfers these to the printer controller 60 for writing into the data store 70. One aspect of the present invention is that the printer controller 60 controls the operation of printer head 10 in accordance with settable parameters stored in data store 70. Based on these parameters, the printer controller reads the required information contained in the printing data stored in the buffer memory 40 and sends control signals to the drivers 62, 64 and 44. In particular controller 60 is adapted for a dot matrix printer for printing an image on a printing medium, the control unit comprising, software or hardware means for controlling printing of the image as at least one set of monochromatic mutually interstitially printed sub-images, and software or hardware means for setting at least one of the number of sub-images and a sequence in which the printing of the sub-images. The controller may be used for independently setting the number of sub-images and the sequence of printing of the sub-images. The controller may be used to set the number of interlacing steps. The controller is also adapted to control the operation of the printing head 10 so that each mutually interstitial printing step and/or each interlacing step is a pass of the printing head 10. As explained above the printing head has an array of marker elements under the control of the controller. For instance the marker element array has two rows and the controller is adapted so that in each mutually interstitial printing step one of the rows is selected to print during an interlacing step. The controller may also be adapted to control the movement of the printing head 10 relative to the printing medium successively in the Y direction for writing a plurality of contiguous swaths of each of a $1^{st}$ to an $N^{th}$ sub-image, the printing medium being transported relative to the printing head over a distance in the X direction equal to the length of active nozzles on the printing head each time a swath of a sub-image has been written. The boundaries between swaths of at least two sub-images preferably do not fall at the same location on the printing medium.

For instance, the printing data is broken down into the individual color components to obtain image data in the form of a bit map for each color component which is stored in the receive buffer memory 30. The sub-images are derived from this bit map, in particular each sub-image will start at a certain offset within the bit map. In accordance with control signals from the printer controller 60, the head driver 44 reads out the color component image data from the image buffer memory 52 in accordance with a specified sequence of printing the sub-images and uses the data to drive the array(s) of nozzles on the print head 10 to mutually interstitially print the sub-images. The data which is stored in data store 70 comprises:

a) the interlacing depth, i.e. the number interlaced lines of print b) the redundancy of the mutual interstitial printing, that is the percentage of the active print nozzles which are used at each line printing operation, c) the number of passes which will make up the interstitial printing operation, and d) the offset in the bit map to be printed for each such pass.

The present invention includes the storing of alternative representations of this data which however amount to the same technique of printing. In each case a) to d) there can be a default value which is assumed to apply if the user does not enter any values. Also, in accordance with the present invention at least one of the parameters a) to d) is settable by the user. With respect to d), the sequence of offsets (and therefore the sequence of dealing with the sub-images) can, for instance, in one embodiment be freely specified by the user and there can be a default sequence if the user does not specify a sequence. This ability to set the sequence allows the user to choose the order in which the sub-images are printed. It will also be appreciated from the above that the user may freely set the number of sub-images to be printed by selecting one or more of the number of passes, the percentage redundancy and the number of interlacing lines. hence, the user may select the complexity of the printing process which has an effect on the quality of print (e.g. lack of banding effects, masking defective nozzles) as well as the time to print (number of passes before the printing is complete).

The present invention also includes that items a) to d) above are machine settable, for instance printer controller 60 sets the parameters for printing, e.g. at least one of items a) to d) above, e.g. in accordance with an optimized algorithm. As indicated above the controller 60 may be programmable, e.g. it may include a microprocessor or an FPGA. In accordance with embodiments of the present invention a printer in accordance with the present invention may be programmed to provide different levels of printing complexity. For example, the basic model of the printer may provide selection of at least one of the number and sequence of printing of the sub-images. An upgrade in the form of a program to download into the microprocessor or FPGA of the controller 60 may provide additional selection functionality, e.g. at least one of the degree of interlacing and the nozzle redundancy. Accordingly, the present invention includes a computer program product which provides the functionality of any of the methods according to the present invention when executed on a computing device. Further, the present invention includes a data carrier such as a CD-ROM or a diskette which stores the computer product in a machine readable form and which executes at least one of the methods of the invention when executed on a computing device. Nowadays, such software is often offered on the Internet or a company Intranet for download, hence the present invention includes transmitting the printing computer product according to the present invention over a local or wide area network. The computing device may include one of a microprocessor and an FPGA.

The data store 70 may comprise any suitable device for storing digital data as known to the skilled person, e.g. a register or set of registers, a memory device such as RAM, EPROM or solid state memory.

While the invention has been shown and described with reference to a preferred embodiment, it will be understood by those skilled in the art that various changes or modifications in form and detail may be made without departing from the scope and spirit of this invention. For instance, with reference to FIG. 7 the parameters for determining the combined mutual interstitial and interlaced printing are stored in data store 70. However, in accordance with the present invention the preparation for the printing file to carry out the above mentioned printed embodiments may be prepared by the host computer 30 and the printer 20 simply prints in accordance with this file as a slave device of the host computer 30. Hence, the present invention includes that the printing schemes of the present invention are implemented in software on a host computer and printed on a printer which carries out the instructions from the host computer without amendment. Accordingly, the present invention includes a computer program product which provides the functionality of any of the methods according to the present invention when executed on a computing device which is associated with a printing head, that is the printing head and the programmable computing device may be included with the printer or the programmable device may be a computer or computer system, e.g. a Local Area Network connected to a printer. The printer may be a network printer. Further, the present invention includes a data carrier such as a CD-ROM or a diskette which stores the computer product in a machine readable form and which can execute at least one of the methods of the invention when the program stored on the data carrier is executed on a computing device. The computing device may include a personal computer or a work station. Nowadays, such software is often offered on the Internet or a company Intranet for download, hence the present invention includes transmitting the printing computer product according to the present invention over a local or wide area network.

The invention claimed is:

1. Dot matrix printing method for printing an image on a printing medium using a printing head having an array of equally spaced marking elements for marking dots on the printing medium while performing fast scan and slow scan movements relative to the printing medium, the method comprising,
   printing the image as at least one set of monochromatic mutually interstitially printed sub-images wherein
   adjacent dots on one scan line extending in the fast scan direction are formed by the different marking element, and
   at least one of the number of sub-images and a sequence in which the printing of the sub-images is performed is settable.

2. The method according to claim 1, wherein the number of sub-images and the sequence of printing of the sub-images are independently settable.

3. The method according to claim 1 wherein the marking elements are spaced apart by a distance "x" in a slow scan direction (X), the method further comprising the step of:
   printing on the printing medium a matrix of dots using mutually interstitial printing steps and interlacing steps, wherein the distance "x" is substantially an integer multiple of the substantially equal distance between lines extending in the fast scan direction (Y).

4. The method according to claim 3, wherein the number of interlacing steps is settable.

5. The method according to claim 3, comprising printing the image as N sub-images, N being the number of colors used for printing multiplied by the number of mutually interstitial printing steps and multiplied by the number of interlacing steps (N=C*P*I).

6. The method according to claim 5, wherein each mutually interstitial printing step is a pass of the printing head.

7. The method according to claim 5, wherein each interlacing step is a pass of the printing head.

8. The method according to claim 3, wherein the marking element array has two rows and in each mutually interstitial printing step one of the rows is selected to print during an interlacing step.

9. The method according to claim 3, wherein the image has a resolution R1, and each sub-image has a resolution R2 being equal to R1 divided by the number of interlacing steps.

10. The method according to claim 3, further comprising the-step of: moving the printing head relative to the printing medium successively in the fast scan direction (Y) for writing a plurality of contiguous swaths of each of the $1^{st}$ to $N^{th}$ sub-image, the printing medium being transported relative to the printing head over a distance in the slow scan direction (X) equal to the active nozzle length each time a swath of a sub-image has been written; boundaries between swaths of at least two sub-images not falling at the same location on the printing medium.

11. The method according to claim 10, wherein all of the boundaries between swaths of the sub-images fall on different locations on the printing medium.

12. A computer program product for executing the method as claimed in claim 1 when executed on a computing device associated with a printing head.

13. A machine readable data storage device storing the computer program product of claim 12.

14. Transmission of the computer product of claim 12 over a local or wide area telecommunications network.

15. An apparatus for dot matrix printing an image on a printing medium, comprising:
   a printing head;
   an array of equally spaced marking elements on the printing head, the marking elements being spaced apart by a distance "x" in a slow scan direction (X);
   means for generating a first relative linear movement between the printing head and the printing medium in a fast scan direction (Y) perpendicular to the slow scan direction (X),
   the apparatus being adapted to print the image as at least one set of monochromatic mutually interstitially printed sub-images wherein
   adjacent dots on one scan line extending in the fast scan direction are formed by different marking elements, and
   at least one of the number of sub-images and a sequence in which the printing of the sub-images is performed is settable.

16. The apparatus according to claim 15, wherein the apparatus is adapted so that each bf the number of sub-images and the sequence of the sub-images is individually settable.

17. The apparatus according to claim 15 wherein the apparatus is adapted to print on the printing medium a matrix of dots using mutually interstitial printing steps and interlacing steps.

18. The apparatus according to claim 17, wherein the apparatus is adapted to print the image as N sub-images, N being the number of colors used for printing multiplied by the number of mutually interstitial printing steps and multiplied by the number of interlacing steps (N=C*P*I).

19. The apparatus according to claim 18, further comprising means for moving the printing head relative to printing medium successively in the fast scan direction (Y) for writing a plurality of contiguous swaths of each of the 1st to Nth sub-image, the printing medium being transported relative to the printing head over a distance in the slow scan direction (X) equal to the active nozzle length each time a swath of a sub-image has been written; boundaries between swaths of at least two sub-images not falling at the same location on tha printing medium.

20. The apparatus according to claim 19, wherein the apparatus is adapted so that all of the boundaries between swaths of the sub-images fall on different locations on the printing medium.

21. The apparatus according to claim 17, wherein the apparatus is adapted so that the number of interlacing steps is settable.

22. The apparatus according to claim 15, wherein the marking elements are ink projecting nozzles.

23. An ink jet printing including an apparatus according to claim 15.

* * * * *